US009463929B2

(12) United States Patent
Ellegaard et al.

(10) Patent No.: US 9,463,929 B2
(45) Date of Patent: Oct. 11, 2016

(54) FLEXIBLE CLOSED BELT CONVEYOR

(71) Applicant: P. Ellegaard A/S, Viborg (DK)

(72) Inventors: Jesper Ellegaard, Roskilde (DK);
Søren F. Pedersen, Taastrup (DE);
Frederik Hjejl Resen Golbæk
Steenstrup, Hillerød (DK); Mads
Kogsgaard Hansen, Taastrup (DK);
Martin Nielsen, Taastrup (DK); Martin
Lindemann, Virum (DK); Niels Hvid,
Vedbæk (DK); Erik Lund Jepsen,
Væløse (DK); Rasmus Nielsen,
Ringsted (DK)

(73) Assignee: P. Ellegaard A/S, Viborg (DK)

( * ) Notice: Subject to any disclaimer, the term of this patent is extended or adjusted under 35 U.S.C. 154(b) by 0 days.

(21) Appl. No.: 14/386,584

(22) PCT Filed: Apr. 2, 2013

(86) PCT No.: PCT/DK2013/050094
§ 371 (c)(1),
(2) Date: Sep. 19, 2014

(87) PCT Pub. No.: WO2013/143551
PCT Pub. Date: Oct. 3, 2013

(65) Prior Publication Data
US 2015/0075950 A1    Mar. 19, 2015

(30) Foreign Application Priority Data
Mar. 30, 2012  (DK) .................................. 2012-70166
Mar. 30, 2012  (DK) .................................. 2012-70167

(51) Int. Cl.
B65G 15/40    (2006.01)
B65G 15/08    (2006.01)

(52) U.S. Cl.
CPC ............... *B65G 15/40* (2013.01); *B65G 15/08* (2013.01)

(58) Field of Classification Search
CPC ...... B65G 15/08; B65G 15/30; B65G 15/38; B65G 15/40
USPC .................................................. 198/819, 846
See application file for complete search history.

(56) References Cited

U.S. PATENT DOCUMENTS 2,839,181 A    6/1958  Renner
3,392,817 A    7/1968  Grimm
(Continued)

FOREIGN PATENT DOCUMENTS

EP    1407986 A1    4/2004
GB    2145388 A     3/1985
(Continued)

OTHER PUBLICATIONS

International Search Report and Written Opinion of PCTDK2013/050094 mailed Aug. 29, 2013.

*Primary Examiner* — Mark A Deuble
(74) *Attorney, Agent, or Firm* — Dinsmore & Shohl LLP

(57) ABSTRACT

The present invention relates to a flexible closed belt conveyor (1) optimized for the requirements in the food industry, the belt comprising a flexible plastic sheet and edge bands welded to the longitudinal edges of the plastic sheet, wherein said endless element is adapted to form a pouch for carrying goods and wherein the maximum thickness of the plastic sheet is less than 1 mm. The invention also deals with a device for balancing the tension between the two edge bands by separating the edge bands in a portion of its pathway.

22 Claims, 15 Drawing Sheets

(56) References Cited

U.S. PATENT DOCUMENTS

| | | | |
|---|---|---|---|
| 4,410,082 A | 10/1983 | McGinnis | |
| 4,505,382 A * | 3/1985 | Mareau | 198/819 |
| 4,915,213 A | 4/1990 | Loodberg et al. | |
| 4,968,546 A * | 11/1990 | Takahashi | 428/36.3 |
| 5,682,974 A * | 11/1997 | Van Der Kooy | 198/819 |
| 5,860,510 A | 1/1999 | Becker | |
| 6,036,000 A | 3/2000 | Loodberg | |
| 6,217,975 B1 | 4/2001 | Daton-Lovett | |
| 7,032,744 B1 | 4/2006 | Pietsch | |
| 7,464,809 B2 * | 12/2008 | Nozaki et al. | 198/847 |
| 2005/0183934 A1 * | 8/2005 | Mindich | 198/819 |
| 2009/0032376 A1 * | 2/2009 | DeGroot | 198/834 |
| 2010/0051423 A1 * | 3/2010 | Kim et al. | 198/846 |
| 2010/0275790 A1 * | 11/2010 | Takai et al. | 99/443 C |

FOREIGN PATENT DOCUMENTS

| | | | |
|---|---|---|---|
| JP | 2001315929 A | 11/2001 | |
| JP | 2002114346 A | 4/2002 | |
| WO | WO 8803905 A1 * | 6/1988 | B65G 15/08 |
| WO | 2007006066 A1 | 1/2007 | |
| WO | 2010103238 A1 | 9/2010 | |

* cited by examiner

FLEXIBLE CLOSED BELT CONVEYOR

CROSS-REFERENCE TO RELATED APPLICATIONS

This application is the U.S. National Phase of PCT/DK2013/050094 filed Apr. 2, 2013, which claims priority of Danish Patent Applications PA 2012 70166 and PA 2012 70167, both filed Mar. 30, 2012.

The present invention relates to a flexible closed belt conveyor optimized for the requirements in the food industry.

BACKGROUND OF INVENTION

Flexible endless conveyor belts that are adapted to form a (pear shaped) pouch for carrying goods are known in the art, e.g. from U.S. Pat. No. 4,915,213, U.S. Pat. No. 5,860,510, U.S. Pat. No. 6,036,000, U.S. Pat. No. 7,032,744 and WO 2010/103238. This type of conveyor belt is typically manufactured in rubber to provide sufficient strength and the flexibility to form the goods-carrying pouch and having longitudinal edges adapted to be engaged by belt drives. The thickness of the known rubber belts are typically on the order of 5 mm or higher. Thus, even though such rubber belts are flexible and bendable they cannot withstand kinking, which limits the minimum turning radius that can be achieved in a conveyor system incorporating closable rubber belts. Kinking a rubber belt may introduce unrepairable damages to the belt.

SUMMARY OF INVENTION

The present invention addresses the issue of kinking by disclosing in a first aspect a conveyor belt for conveying goods in solid or liquid state. The conveyor belt comprises a goods-carrying endless element comprising a flexible plastic sheet and edge bands welded or glued to the longitudinal edges of the plastic sheet, wherein said endless element is adapted to form a pouch for carrying goods and wherein the maximum thickness of the plastic sheet is less than 1 mm. By substituting the stiffer rubber with a plastic sheet the flexibility of the conveyor belt is greatly increased and turning radii down to 30 cm may be achieved in a conveyor system incorporating the plastic sheet based conveyor belt according to the invention. A reduced minimum turning radius greatly improves the design options when outlining the conveyor system. A further advantage of the present invention is greatly reduced production and manufacturing costs. The plastic sheet itself is very cost efficient and welding or gluing the edge bands to the longitudinal edges is a cost efficient manufacturing process.

The flexibility of the plastic sheet may add manufacturing variations to the endless element, e.g. the length of one longitudinal edge of the endless element may be different from the other opposite longitudinal edge. This may induce local tension in the flexible conveyor belt and cause problems due to unequal lengths of the two edge bands. A further aspect of the invention addresses this problem by disclosing a device for balancing the tension in the two edge bands of an endless (flexible) conveyor belt comprising a rotation point and two guiding elements for guiding the longitudinal edges of the belt, the locations of the rotation point and the guiding elements fixed in relation to each other and forming a triangle, wherein the rotation point of the device is adapted to be secured to an axis of rotation extending in a transverse direction of the conveyor belt, such that the device can rotate around the rotation point in a plane perpendicular to the axis of rotation while guiding and separating the longitudinal edges of the conveyor belt with the guiding elements.

A further embodiment of the invention relates to a method for balancing the tension in the two edge bands of an endless flexible conveyor belt in conveying motion, by separating the longitudinal edges of the belt between two closure points by means of at least two edge guiding elements mounted in a resilient and/or elastic and/or rotatable and/or slidable suspension, such that for a section of the belt extending between the closure points and with the longitudinal edges of the belt section stretched between the guiding elements, the slack edge of said belt section is guided along a longer path between the closure points than the tense edge of said belt section, the difference in length of said paths being self-adjustably determined by the tense edge of said belt section acting on the suspension, thereby at least partly equalizing edge tension in said belt section.

DESCRIPTION OF DRAWINGS

The invention will now be described in further detail with reference to the drawings in which FIG. 6a illustrates a perspective view of the tension balancing device according to one embodiment of the invention when the opposing edges have different tension.

DETAILED DESCRIPTION OF THE INVENTION

In the preferred embodiment of the invention the endless element is adapted to be transverse deformable into a closed pouch. The pouch is preferably extending between the edge bands. Thus, when the belt forms a pouch the endless element is suspended between the edge bands. The two edge bands 2 may be seen as two tensile force (longitudinal)-absorbing members that extends throughout the entire length of the endless element 1. The edge bands 2 are each connected by welding or gluing to a respective longitudinal edge portion of the endless element 1. The edge bands 2 are projecting from the plane of said edge portion for cooperation with guide rollers/belt drives 5/pulleys.

The plastic sheet may be very thin and still provide adequate carrying capacity for use e.g. in the food industry. The thickness of the plastic sheet is a balancing between sufficient carrying capacity (greater thickness=greater carrying capacity), the ability to withstand kinking (smaller thickness=better ability to withstand kinks) and manufacturing issues (i.e. it may be difficult to attach edge band to a a very thin plastic sheet may). In one embodiment the thickness of the plastic sheet is greater than 0.4 mm but less than 0.6 mm, e.g. approx. 0.5 mm. With this thickness of only 0.5 mm the carrying capacity of the conveyor belt is approx. 10 kg. pr. meter, however with a good ability to withstand kinking. In a further embodiment the maximum thickness of the plastic sheet is less than 0.9 mm, such as less than 0.8 mm, such as less than 0.7 mm, such as less than 0.6 mm, such as less than 0.5 mm, such as less than 0.4 mm, such as less than 0.3 mm, such as less than 0.2 mm.

A further embodiment relates to a conveyor belt comprising a goods-carrying endless element comprising a flexible plastic sheet and edge bands welded or glued to the longitudinal edges of the plastic sheet, wherein said endless element is adapted to form a pouch for carrying goods and wherein the maximum thickness of the plastic sheet is less than 3 mm, such as less than 2.5 mm, such as less than 2 mm, such as less than 1.5 mm.

Figure 5A:
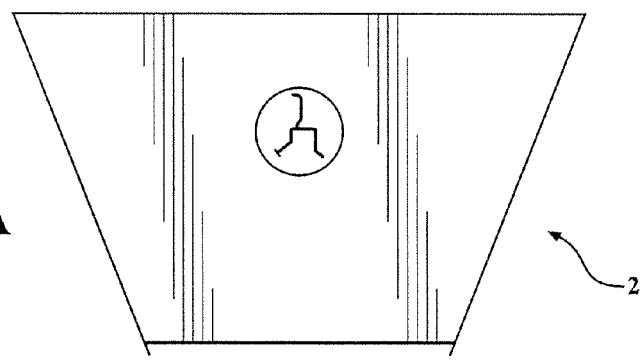
FIG. 5a is a cross-sectional illustration of a steel reinforced non-cogged V-belt that can be used as edge bands on the belt.

In one embodiment of the invention the edge bands 2 are adapted to be engaged by a belt drive 5. E.g. each edge band 2 may be a V-belt. The edge bands 2 may be shaped to induce a wedging action with a matching belt drive. E.g. the cross-section of each edge band may be trapezoidal. In one embodiment of the invention the plastic sheet and the edge bands are made of the same plastic material, such as polyurethane. This has the advantage that it eases a heat welding process between the sheet and the edge bands. The edge bands may be made of a plastic material, such as polyurethane, and may be reinforced with polyester, aramid, glass fibre or other suitable material. The edge bands are preferably non-cogged, however they may also be cogged. An example is illustrated in FIG. 5a showing a cross-section of a non-cogged reinforced trapezoidal edge band 2. Edge bands 2 can also be seen in FIGS. 3a, 3b, 4a, 4b and 5b.

Figure 1:
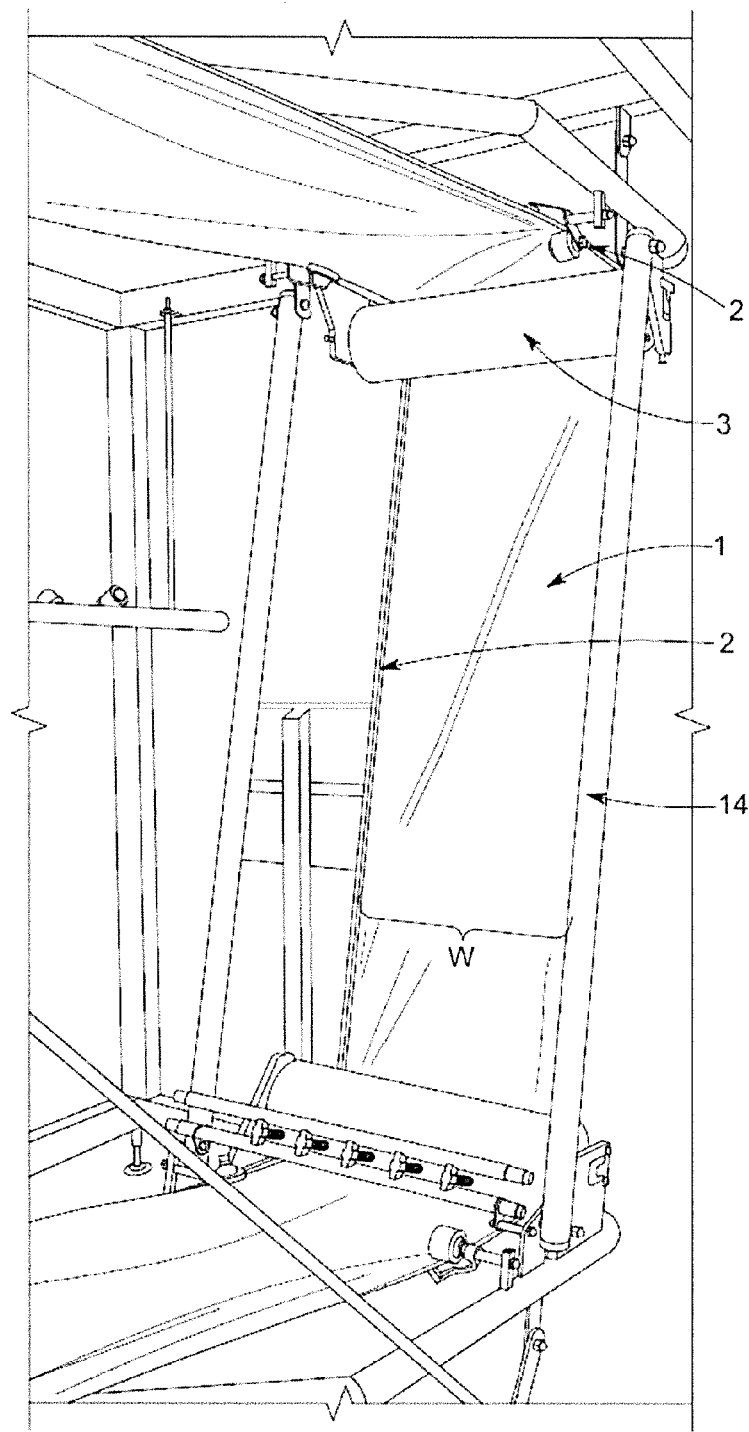
FIG. 1 illustrates a plastic sheet based conveyor belt in a folded out condition.
Figure 9B:
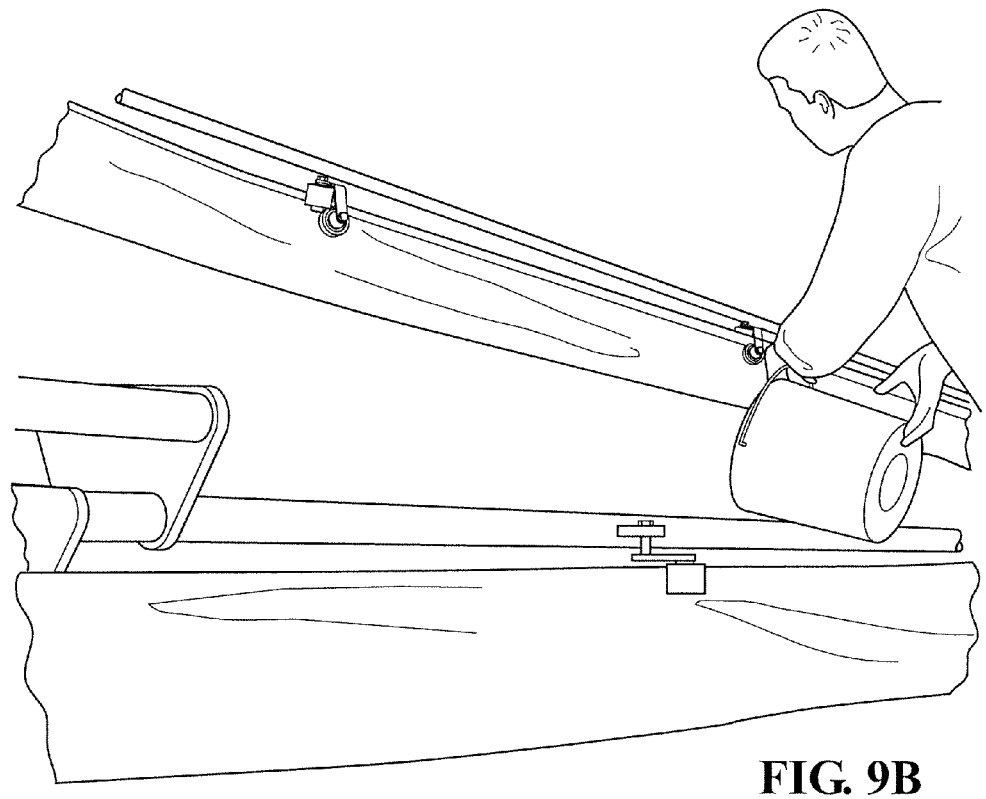
FIG. 9b illustrates a conveyor frame system hanging down from the ceiling.
Figure 10A:
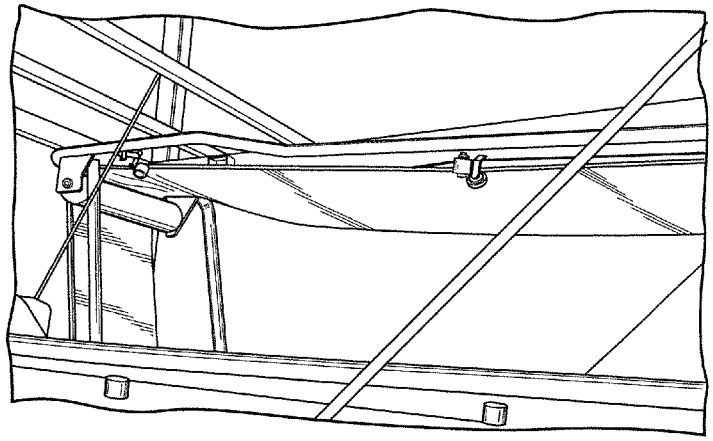
FIG. 10a shows a section of the plastic sheet based conveyor belt forming a closed pouch to the right and moving to the left where opening for unloading.
Figure 10B:
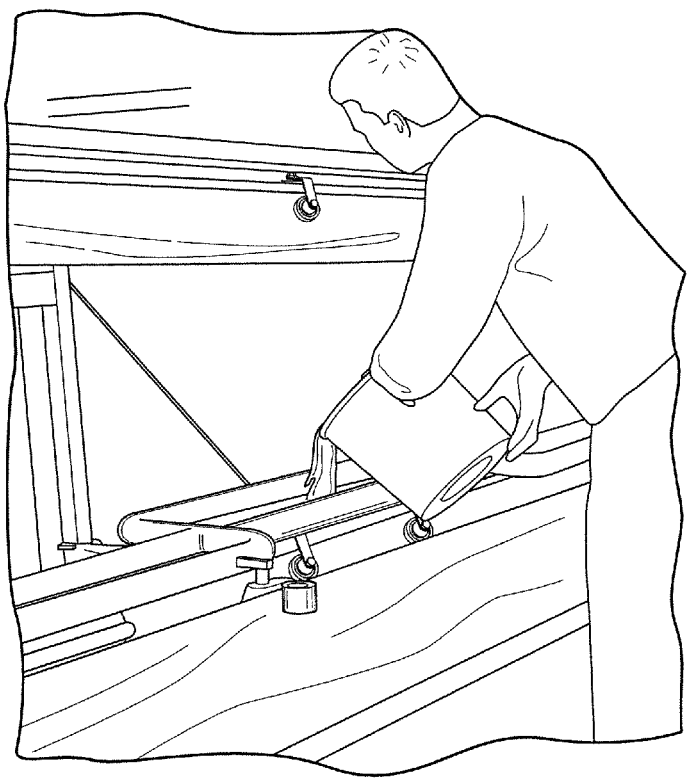
FIG. 10b shows a loading module for the plastic sheet based conveyor belt wherein, the goods are poured into the pouch from a bucket.
Figure 10C:
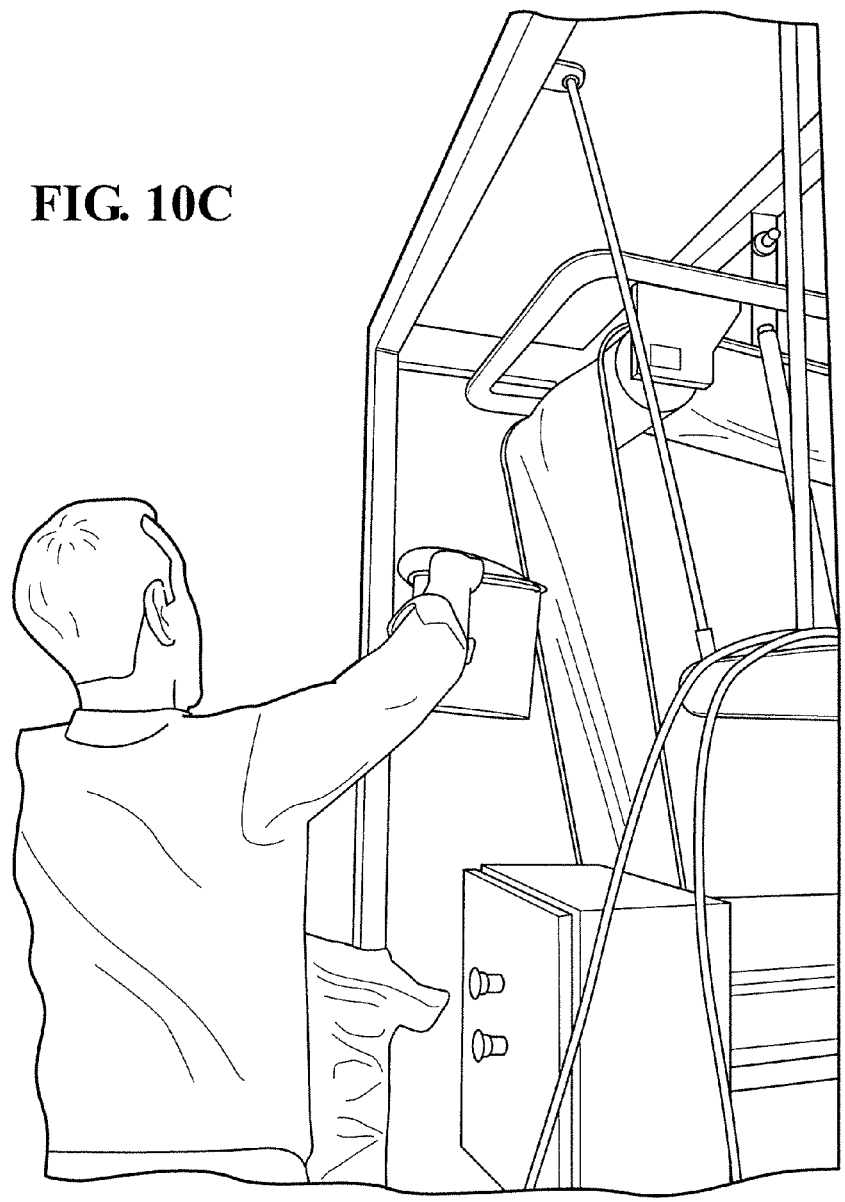
FIG. 10c shows an unloading module for the plastic sheet based conveyor belt wherein, the goods are returned to the bucket.

In one embodiment of the invention the endless element is adapted to form a closed pouch, preferably a closed sealed pouch. An advantage of the closed pouch is that the goods being transported by the belt inside the closed pouch are isolated from the surroundings. This is a major advantage in the food industry. Thus, when the goods are transported by the conveyor belt the endless element forms a closed sealed pouch, except for sections where the closed pouch must be opened for loading or unloading of the goods. The goods-carrying volume formed by the pouch is illustrated with the numeral 4 in FIGS. 2c, 3a, 3b, 6c and 7a, where the endless element is shown in a folded condition forming a pouch, but not necessarily a closed pouch. A loading section where the pouch is open is visible in FIGS. 9b and 10b where goods are poured into the conveyor belt from a bucket. An unloading section is visible in FIG. 10c where conveyor belt is in a folded out conditions and the goods are returned to the bucket. FIG. 10a shows the section leading to the unloading section where the conveyor belt is forming a closed pouch to the right and moving to the left where opening for unloading. FIG. 1 shows the unloading section seen from behind.

Figure 11:
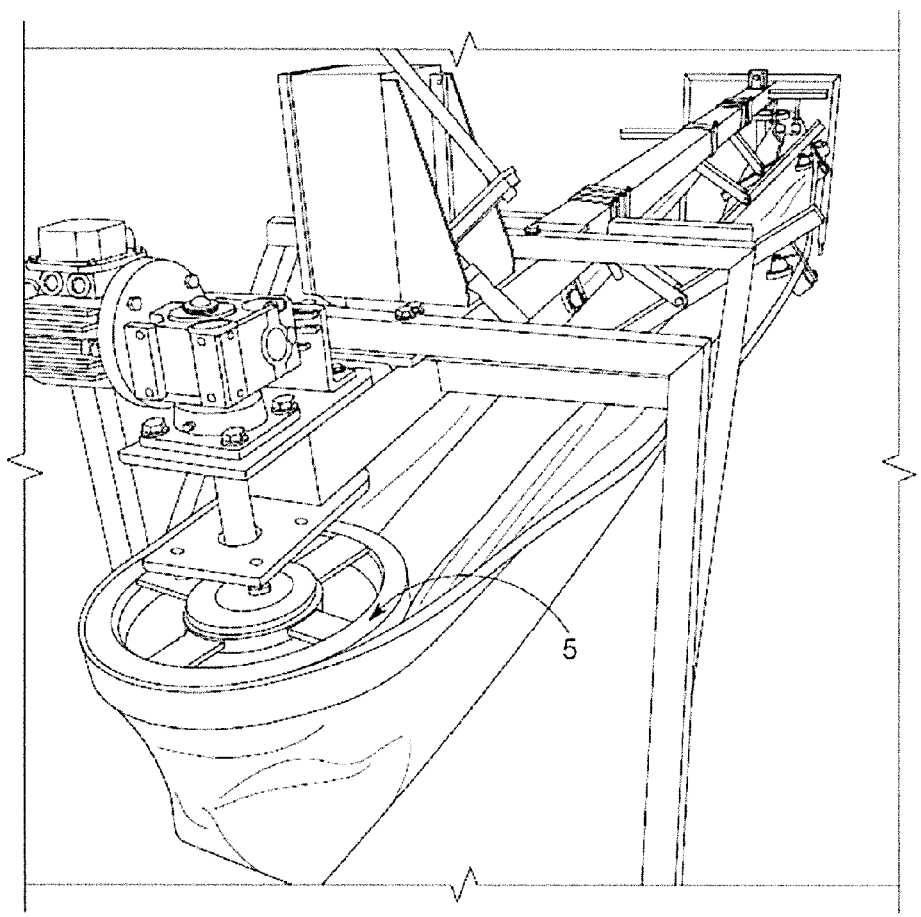
FIG. 11 illustrates an unloading module for the plastic sheet based conveyor belt where dry matter goods are unloaded into a container.
Figure 12:
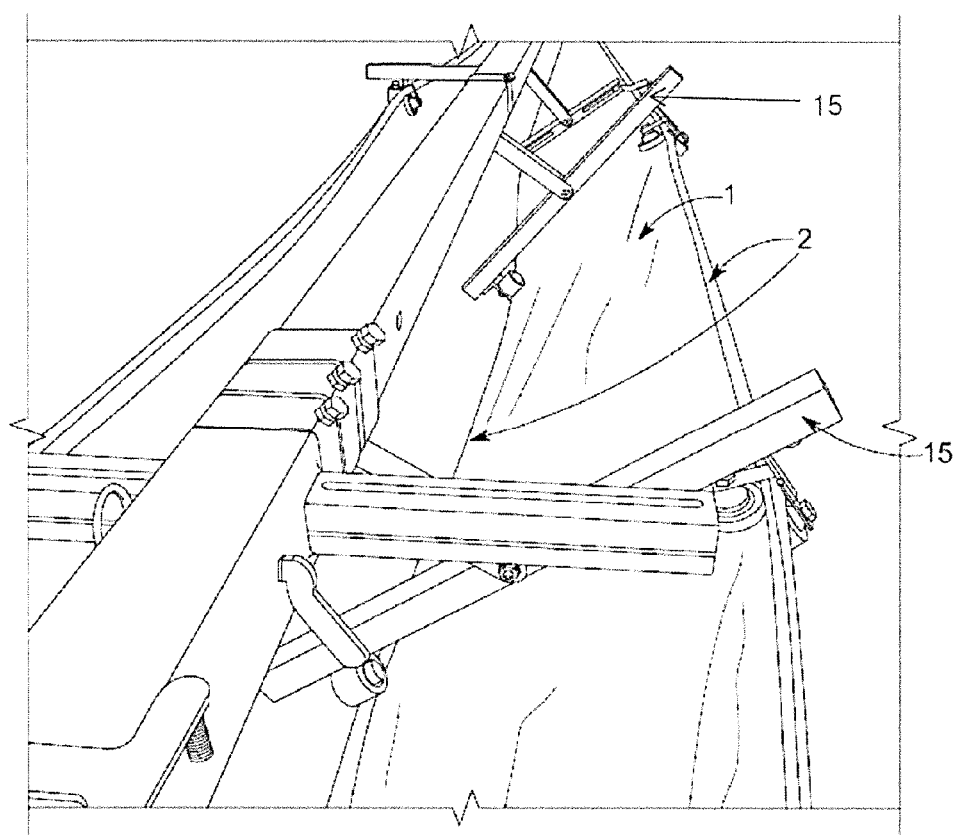
FIG. 12 shows a close-up view of the unloading module shown in FIG. 11.

Another method of unloading goods from the present endless element 1 is illustrated in FIGS. 11 and 12. Adjacent to a single belt drive 5 the endless element 1 is brought to an open and completely stretched condition by the guide rollers 15 which furthermore tilts the endless element 1 transversely such that any goods lying inside the endless element 1 will slide off the element 1 over one of the edges 2 and into a container. Gravity and the slippery surface of the plastic sheet will make sure that goods will slide off. When the edge bands are welded or glued to opposite sides of the plastic sheet the sideways unloading procedure can be provided over an edge-free side, i.e. there is no edge band stopping the goods at the edge of the plastic sheet. The flexibility and kinkability of the endless element 1 enables this sideways unloading procedure. A further embodiment of the invention therefore relates to a method for unloading goods from a conveyor belt as described herein. The method comprises the steps of opening and stretching the endless element to the full width (of the endless element) and tilting said endless element transversely around the longitudinal axis of propagation such that the stretched endless element forms an angle with respect to a horizontal plane. The endless element thereby forms a plane in itself. This angle is preferably between 20 and 60 degrees, such as at least 15 degrees, or at least 20 degrees, or at least 25 degrees, or at least 30 degrees, or at least 35 degrees, or at least 40 degrees, or at least 45 degrees, or at least 50 degrees, or at least 55 degrees, or at least 60 degrees, or less than 75 degrees, or less than 70 degrees, or less than 65 degrees, or less than 60 degrees, or less than 55 degrees, or less than 50 degrees, or less than 45 degrees, or less than 40 degrees, or less than 35 degrees, or less than 30 degrees. The transverse tilting of the endless element is preferably provided over a predefined distance of the path of the conveyor belt.

Figure 5B:
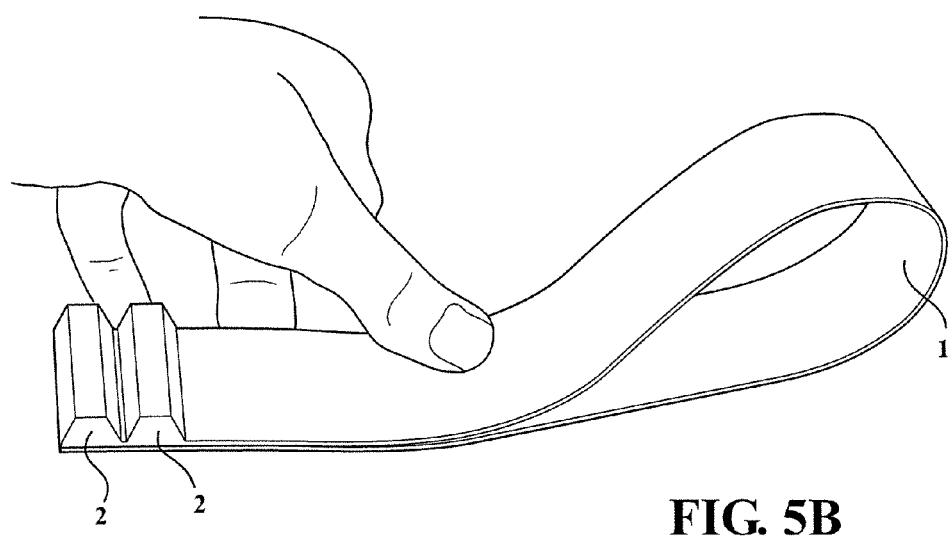
FIG. 5b illustrates a close-up view of a cut-out of the belt showing an example of the orientation of the edge bands.

One way of achieving a closed and possibly sealed pouch is by welding the edge bands to opposite sides of the plastic sheet. I.e. in the open condition of the belt the edge bands are projecting from opposite sides of the endless element whereas in the closed condition of the conveyor belt the edge bands align longitudinally with one edge band extending outside the other opposite edge band and with the edge bands projecting in the same direction. This can be seen in FIGS. 4a, 4b, 5b and 5c. E.g. FIG. 5b is a photo of a cut-out of the endless element 1 being held in a folded and closed condition on a table. The edge bands 2 are aligned and projecting in the same direction but welded to opposite sides of the endless element 1.

Figure 5C:
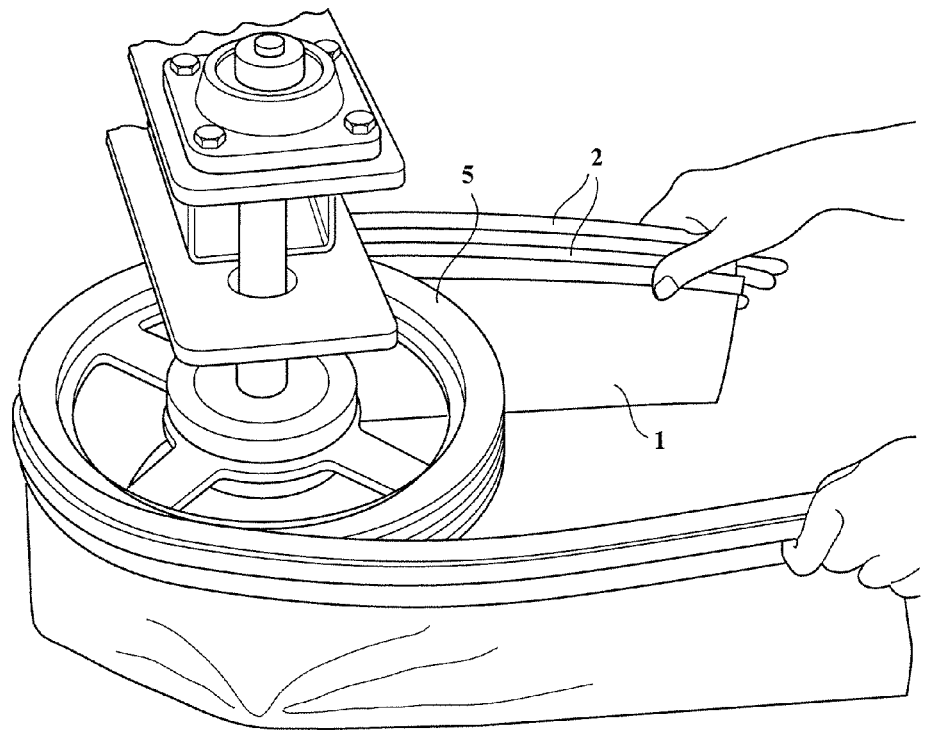
FIG. 5c illustrates how a plastic sheet based conveyor belt according to one embodiment of the invention can be guided by a single belt drive in a fully closed condition.
Figure 9A:
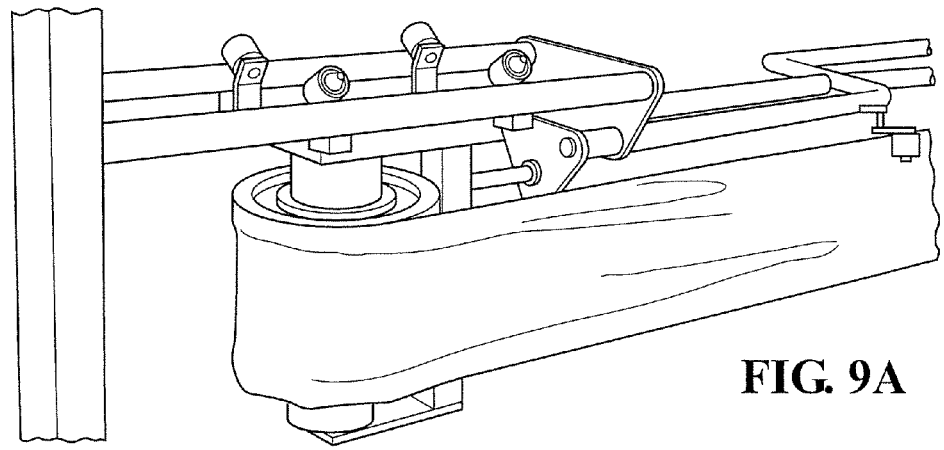
FIG. 9a illustrates a combined belt drive belt tensing with a moving sledge to provide pre-tension of the plastic sheet based conveyor belt.

A further advantage of the edge bands 2 welded to opposite sides of the endless element 1 is that the conveyor belt can be engaged by a single belt drive 5 in said closed pouch condition. This is illustrated in FIGS. 5c and 9a where the endless element 1 is closed and the edge bands project in the same direction towards the belt drive 5. In FIG. 9a the conveyor belt is driven by a single belt drive mounted on a vertical drum motor which is mounted on a belt tensing device with a moving sledge to provide pre-tension of the plastic sheet based conveyor belt.

Figure 2A:
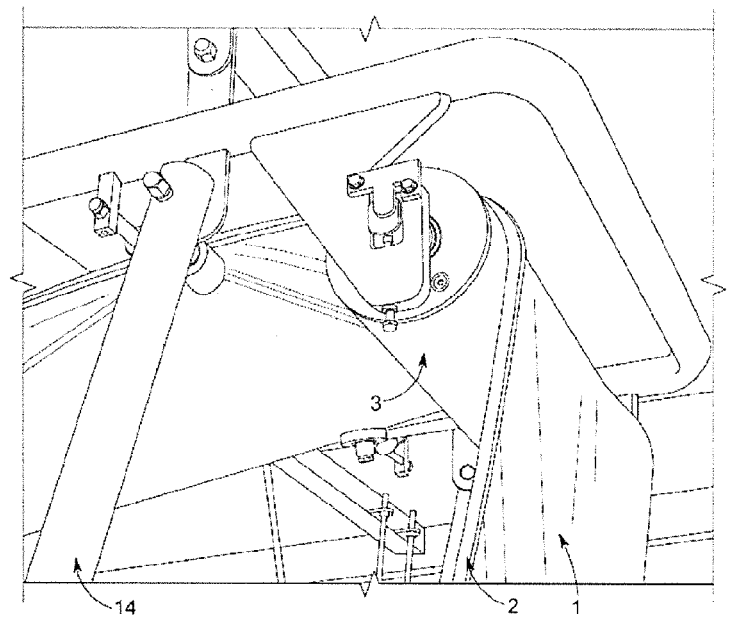
FIG. 2a illustrates plastic sheet based conveyor belt rolling over a conveyor roll.
Figure 2B:
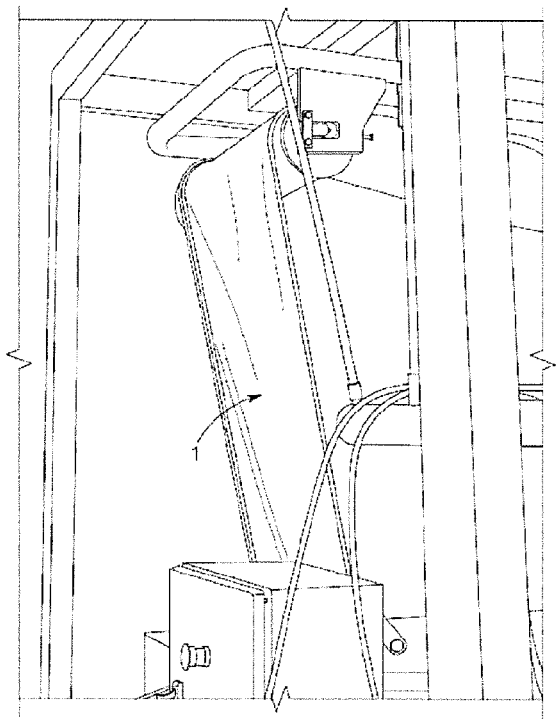
FIG. 2b illustrates another view of a plastic sheet based conveyor belt in a folded out condition.
Figure 2C:
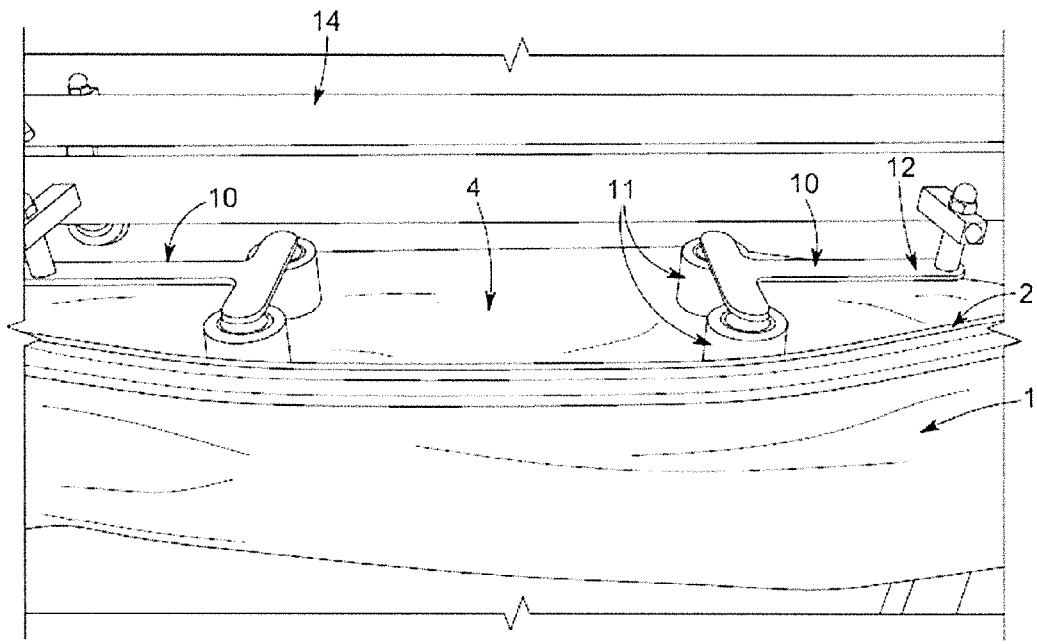
FIG. 2c illustrates a plastic sheet based conveyor belt in a folded condition forming a pouch, and two devices for balancing the tension of the conveyor belt.
Figure 3A:
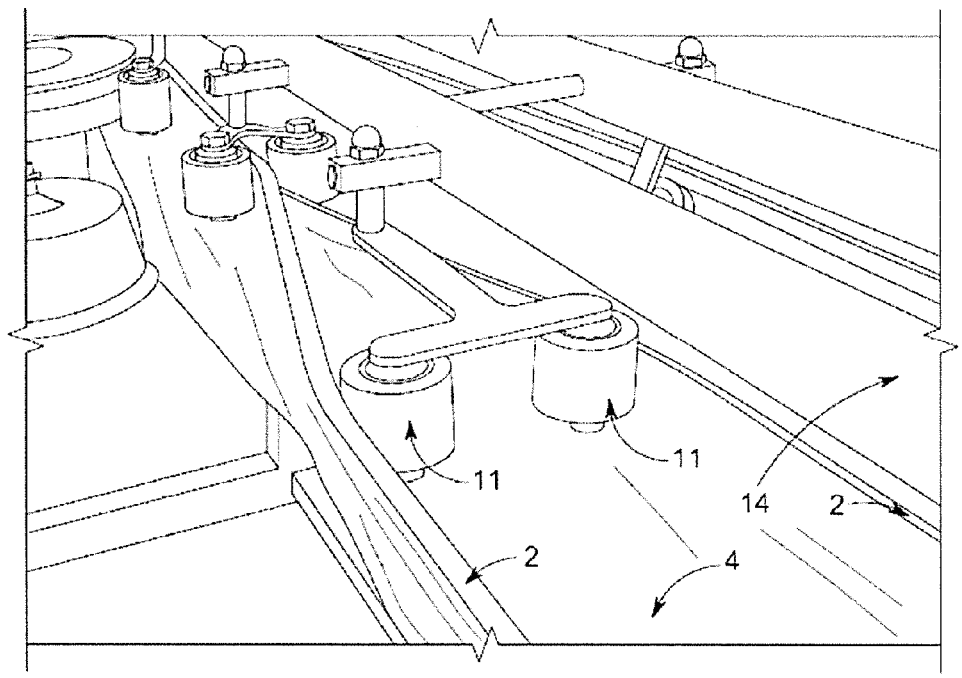
FIG. 3a illustrates a close-up view of tension balancing devices guiding the plastic based conveyor belt.
Figure 3B:
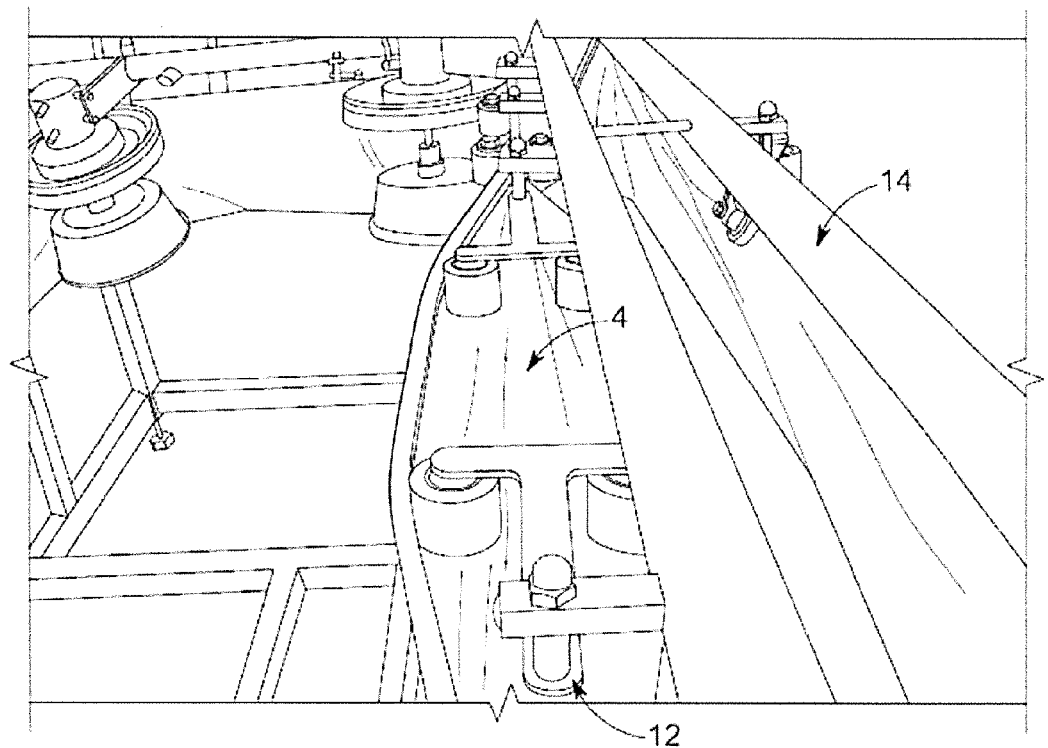
FIG. 3b illustrates another close-up view of tension balancing devices guiding the plastic based conveyor belt.
Figure 4A:
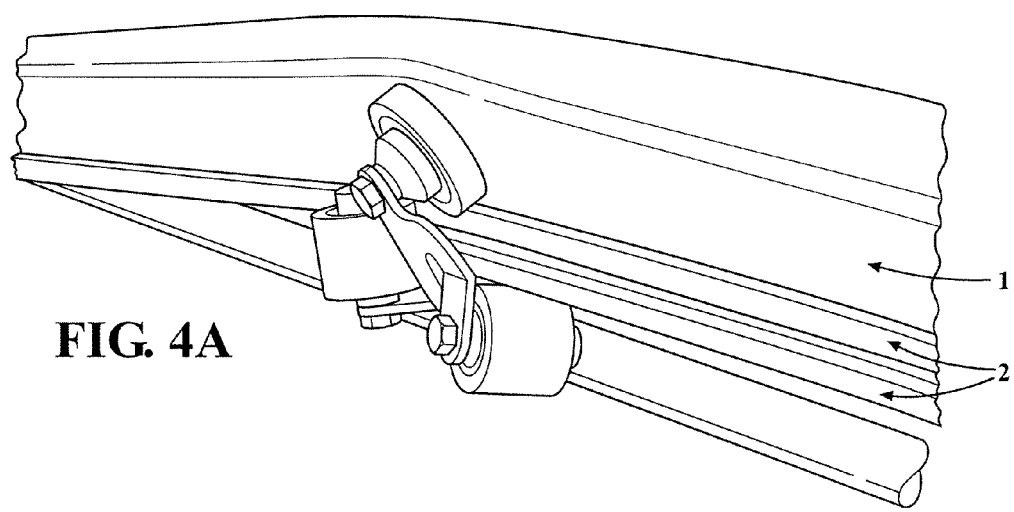
FIG. 4a illustrates a close-up view of the edge bands which are welded to the longitudinal edges of the belt.
Figure 4B:
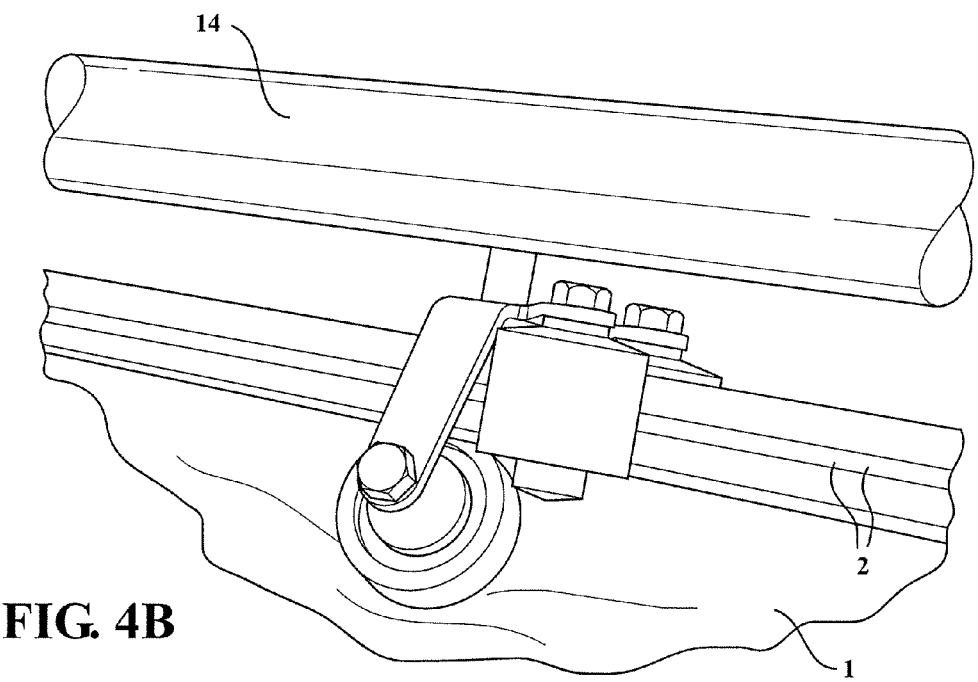
FIG. 4b illustrates another close-up view of the edge bands which are welded to the longitudinal edges of the belt.

In one embodiment of the invention the width "w" of the endless element is less than 1.5 m, such as less than 1.25 m, such as less than 1 m, such as less than 0.9 m, such as less than 0.8 m, such as less than 0.7 m, such as less than 0.6 m, such as less than 0.5 m, such as less than 0.4 m, such as greater than 0.3 m, such as greater than 0.4 m, such as greater than 0.5 m, such as greater than 0.6 m, such as greater than 0.7 m, such as greater than 0.8 m, such as greater than 0.9 m, such as greater than 1 m, such as greater than 1.2 m. The width "w" of the endless element is indicated in FIG. 1. FIGS. 1, 2a and 2b show the endless element 1 in a folded out condition, i.e. completely stretched out. In this condition the endless element does not carry goods, but this folded out condition is very suitable for a thorough cleaning of the endless element. This makes the present conveyor belt suitable for the food industry.

In one embodiment of the invention the material of the plastic sheet is selected from the group of thermoplastic polymers, such as food approved thermoplastic polymers, such as polyurethane or polyethylene.

Figure 8A:
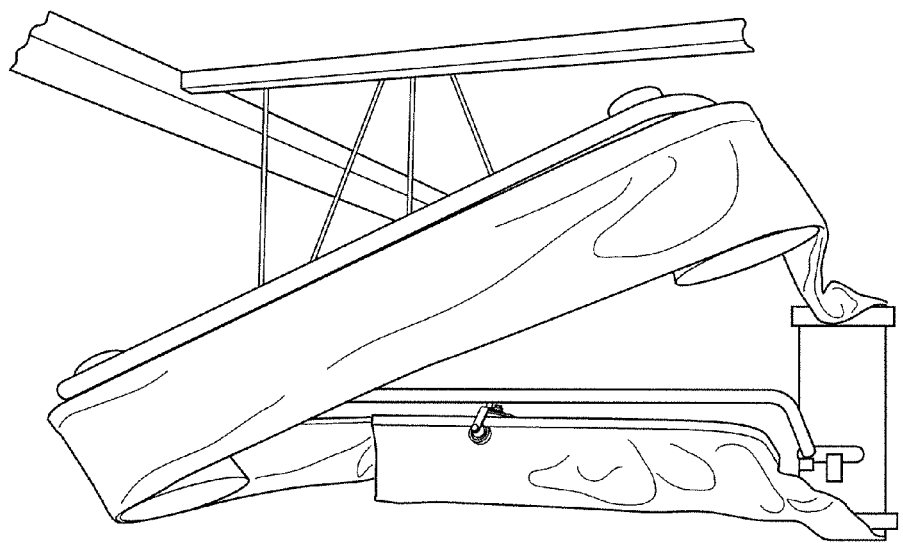
FIG. 8a illustrates a plastic sheet based conveyor belt with an inclination angle of approx. 30°.
Figure 8B:
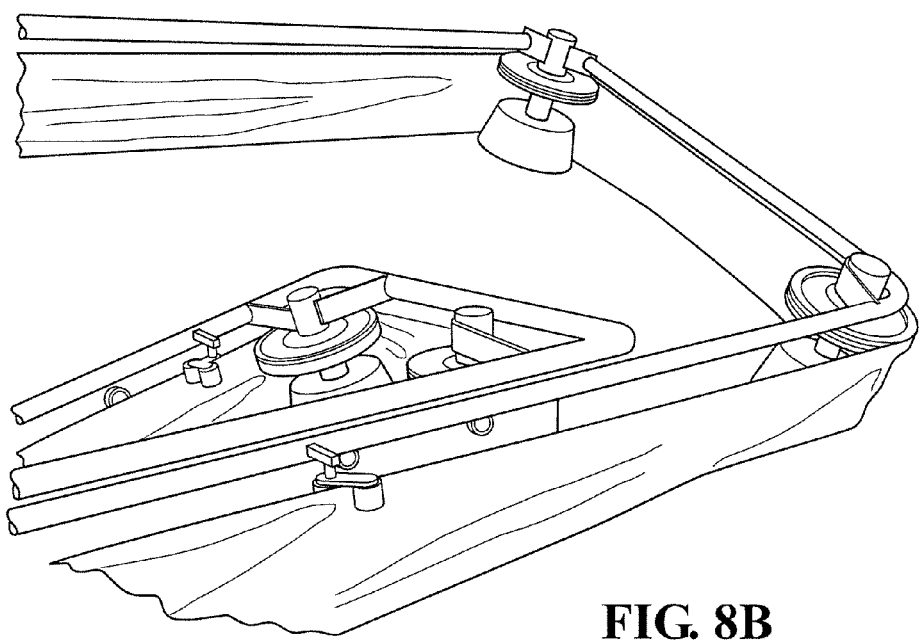
FIG. 8b illustrates a small turning radius of the plastic sheet based conveyor belt.

A major advantage of using a thin plastic sheet is that the conveyor belt thereby is adapted to withstand kinking. This enables very small turning radii of the conveyor belt. In one embodiment of the invention the turning radius of the conveyor belt in the closed pouch condition is less than 0.6 m, such as less than 0.5 m, such as less than 0.4 m, such as less than 0.3 m, such as less than 0.2 m. In the unfolded condition the available turning radius is even smaller. The turning radius of the conveyor belt in unfolded condition may be less than 0.08 m, such as less than 0.07 m, such as less than 0.06 m, such as less than 0.05 m, such as less than 0.04 m. This greatly increases the flexibility of a conveyor system incorporating the conveyor belt according to the present invention. Examples are shown in FIGS. 8a, 8b and 9a illustrating the very small turning radii that are possible with the plastic sheet based conveyor belt, in the illustrated examples the belt is in the closed pouch condition. FIG. 8a further shows that it is possible to transport goods with a very high inclination angle, in this case around 30°.

The small weight and the flexibility of the present conveyor belt enables integration into a conveyor system with a frame that in general comprises a backbone, e.g. tube shaped, fixed in suspensions hanging down from the ceiling and with beams or brackets attached to pillars or a wall. This is e.g. illustrated in FIG. 8a, where the conveyor belt is supported by frame suspended from above.

As previously stated a further aspect of the invention relates to a device for balancing the tension in the two edge bands of an endless (flexible) conveyor belt. Examples of such a device 10 is shown in FIGS. 2c, 3a, 3b, 6a, 6b, 6c, 7a, 7b and 7c. The device 10 comprises a rotation point 12 and two guiding elements 11 for guiding the longitudinal edges 2 of the belt, the locations of the rotation point 12 and the guiding elements 11 fixed in relation to each other and forming a triangle, wherein the rotation point 12 of the device is adapted to be secured to an axis of rotation 12' extending in a transverse direction of the conveyor belt 1, such that the device 10 can rotate around the rotation point 12 in a plane perpendicular to the axis of rotation 12' while guiding and separating the longitudinal edges 2 of the conveyor belt 1 with the guiding elements 11. The device 10 is preferably adapted to be mounted between two closure points 13 of the conveyor belt 1. At a closure point 13 the conveyor belt is going from a partly open condition to a closed condition or vice versa, i.e. from a folded condition with the belt forming a pouch, but not a closed pouch, to a closed and sealed pouch condition. Closure points are illustrated in FIGS. 6a, 6c, 7a and 7b.

The device 10 is based on the principle of a method for balancing the tension of an endless flexible conveyor belt in conveying motion, by separating the longitudinal edges of the belt between two closure points by means of at least two edge guiding elements mounted in a resilient and/or elastic and/or rotatable and/or slidable suspension, such that for a section of the belt extending between the closure points and with the longitudinal edges of the belt section stretched between the guiding elements, the slack edge of said belt section is guided along a longer path between the closure points than the tense edge of said belt section, the difference in length of said paths being self-adjustably determined by the tense edge of said belt section acting on the suspension, thereby at least partly equalizing edge tension in said belt section. The suspension may comprise one or more springs. The suspension may be rotatable with the axis of rotation extending in a transverse direction of the conveyor belt. The above mentioned device is an example of this. The suspension can also be a slidable element which is adapted to slide to each (opposite) side depending on the tension in the belt.

Figure 6A:
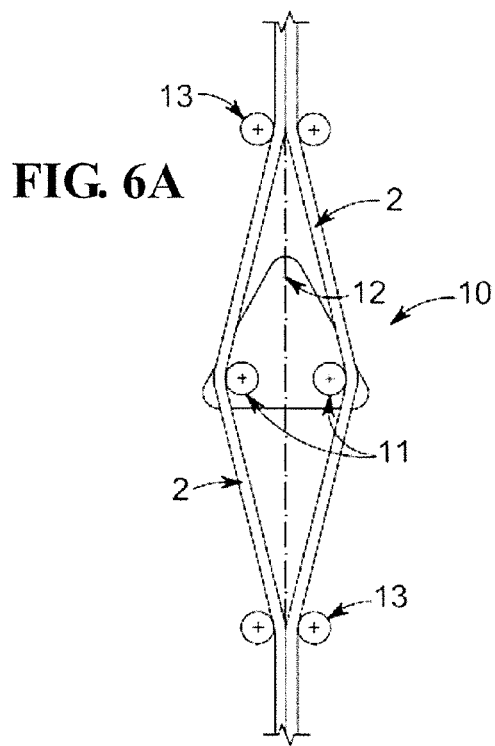
FIG. 6a illustrates a top-view of the tension balancing device according to one embodiment of the invention.
Figure 6B:
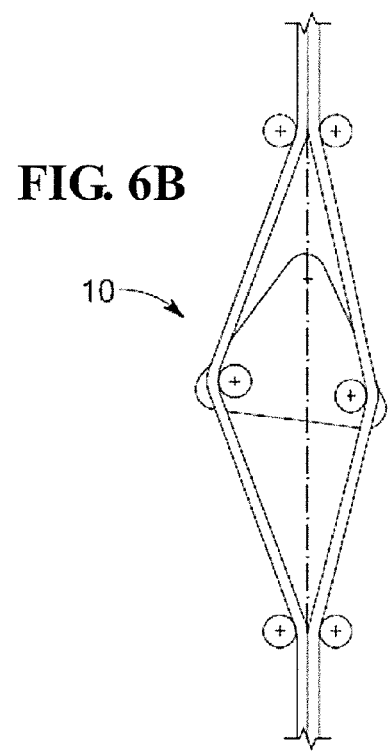
FIG. 6b illustrates a top-view of the tension balancing device according to one embodiment of the invention when the opposing edges have different tension.
Figure 6C:
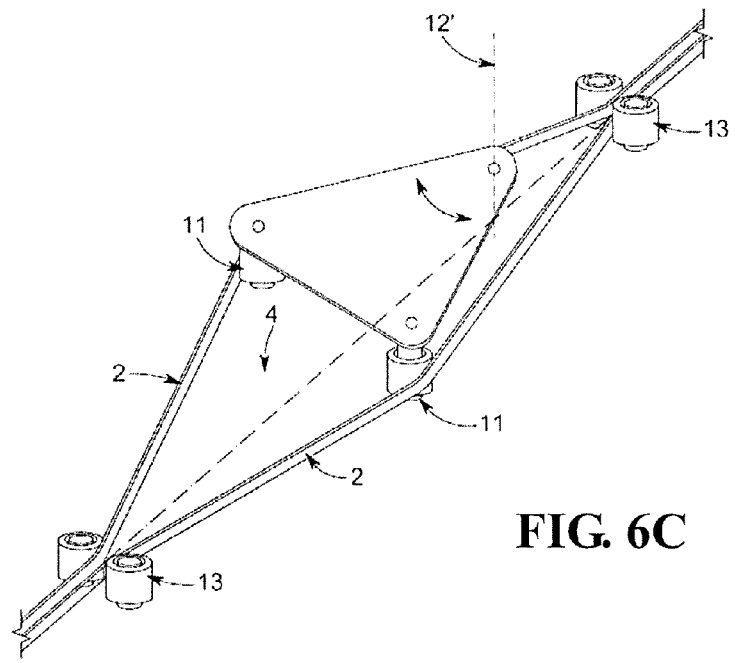

Thus, in one embodiment of the invention the device 10 is adapted to rotate when there is a difference in tension between parallel/opposite sections of the two longitudinal edges 2 of the belt. When the device 10 rotates around the rotation point 12, the paths of the two longitudinal edges of the belt between two closure points becomes different. This is illustrated in FIGS. 6a and 6b. In FIG. 6a the device 10 is straight and the two paths left and right around the device 10 are equal. In FIG. 6b the right edge is more tense forcing the device 10 to rotate slightly around the rotation axis 12'. The path left around the device 10 is now longer than the right path thereby equaling the tension that forced the device to rotate. Stippled guide lines are inserted in FIGS. 6a, 6b and 6c showing the straight line between the closure points. These guide lines more clearly illustrate that the left path in FIG. 6b is longer than the right path, and they also illustrate that the rotation axis is located on this line.

In one embodiment of the invention the rotation point 12 and the guiding elements 11 are mounted in a rigid frame, such as mounted on a rigid plate.

Figure 7A:
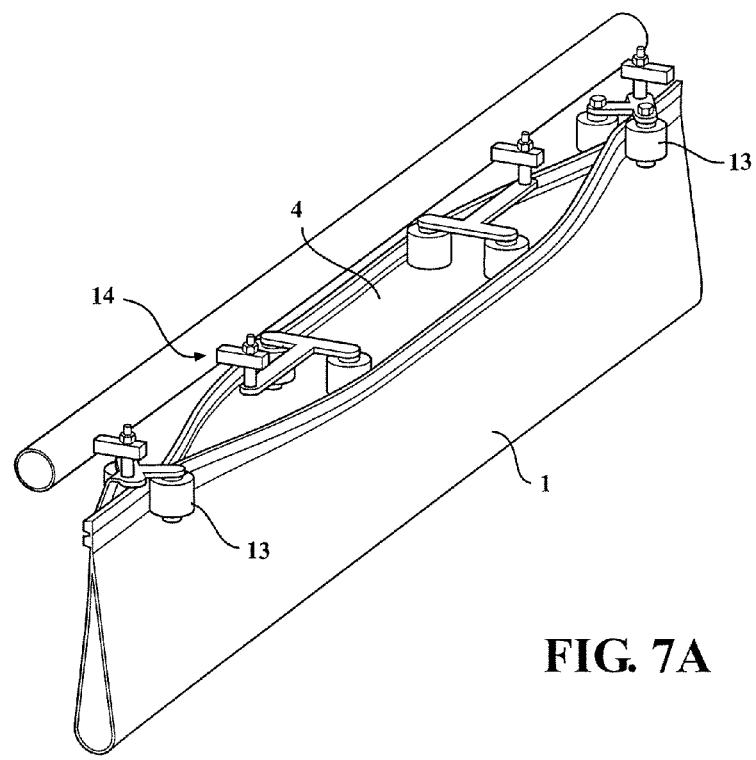
FIG. 7a is a perspective illustrations of the plastic based conveyor belt and tension balancing devices according to one embodiment of the invention.
Figure 7B:
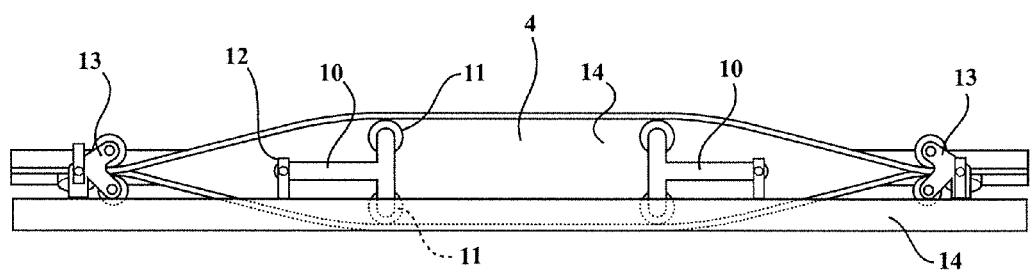
FIG. 7b is a top-view illustration of the plastic based conveyor belt and tension balancing devices according to one embodiment of the invention.

In one embodiment of the invention the axis of rotation 12' is vertical and/or the plane of rotation is horizontal. The axis of rotation 12' is preferably located substantially in line with the conveyor belt 1. This is e.g. illustrated in FIG. 7b showing a top view illustration of two of the devices 10 mounted in line with the conveyor belt. The guiding elements may be pulleys.

Figure 7C:
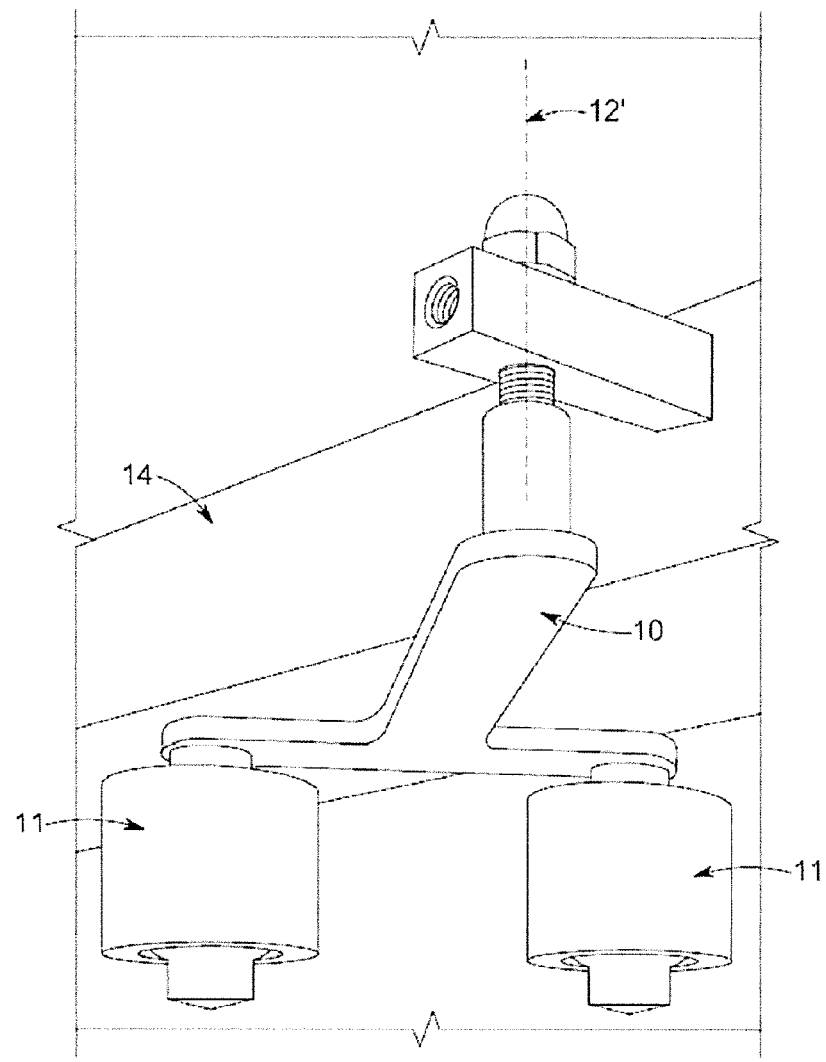
FIG. 7c is a perspective illustration of an embodiment of the tension balancing device suspended in the rotation axis.

The device may be mounted on the conveyor frame 14 as illustrated in FIGS. 2c, 3a, 3b, 7a and most clearly in FIG. 7c.

As illustrated in e.g. FIG. 7b the devices may be arranged in series above the conveyor belt. This may be combined with a loading section, i.e. FIG. 7b can be a loading section of the conveyor belt where goods can be poured into the open pouch through the opening 4.

The invention claimed is:

1. A conveyor belt system for conveying goods in solid or liquid state, said conveyor belt comprising:
   a goods-carrying endless element comprising a smooth non-woven flexible plastic sheet and edge bands welded or glued to the longitudinal edges of the plastic sheet;
   a plurality of edge guiding elements supporting and guiding the edge bands of the endless element;
   wherein said endless element has a first configuration in which some of the edge guiding elements transversely deform the endless element into a pouch for carrying goods;
   wherein said endless element has a second unfolded configuration in which other of the edge guiding elements stretch the endless element between the edge bands; and
   wherein the maximum thickness of the plastic sheet is less than 0.7 mm.

2. The conveyor belt system according to claim 1, wherein the pouch of the first configuration extends between the edge bands.

3. The conveyor belt system according to claim 1, wherein the endless element in the first configuration is transversely deformed into a closed pouch.

4. The conveyor belt system according to claim 1, wherein the maximum thickness of the plastic sheet is selected from the group consisting of: less than 0.6 mm, or less than 0.5 mm, or less than 0.4 mm, or less than 0.3 mm, or less than 0.2 mm.

5. The conveyor belt system according to claim 1, wherein the thickness of the plastic sheet is greater than 0.3 mm but less than 0.6 mm.

6. The conveyor belt system according to claim 1, wherein the plastic sheet and the edge bands are made of the same plastic material.

7. The conveyor belt system according to claim 1, wherein the edge bands are welded or glued to opposite sides of the plastic sheet.

8. The conveyor belt system according to claim 1, further comprising:
   a single belt drive;
   wherein the endless element in the first configuration is transversely deformed into closed pouch and engaged by the single belt drive.

9. The conveyor belt system according to claim 1, further comprising:
   a belt drive;
   wherein the edge bands are engaged by the belt drive.

10. The conveyor belt system according to claim 1, wherein each edge band is a V-belt.

11. The conveyor belt system according to claim 1, further comprising:
    a belt drive;
    wherein the edge bands are shaped to induce a wedging action with the belt drive, the belt drive a shape matching the shaped edge bands.

12. The conveyor belt system according to claim 1, wherein the cross-section of each edge band is trapezoidal.

13. The conveyor belt system according to claim 1, wherein the edge bands are made of polyurethane.

14. The conveyor belt system according to claim 1, wherein the edge bands are made of polyurethane reinforced with polyester, aramid or glass fiber.

15. The conveyor belt system according to claim 1, wherein the edge bands are non-cogged.

16. The conveyor belt system according to claim 1, wherein the width of the belt is selected from the group consisting of: less than 1.5 m, or less than 1.25 m, or less than 1 m, or less than 0.9 m, or less than 0.8 m, or less than 0.7 m, or less than 0.6 m, or less than 0.5 m, or less than 0.4 m, or greater than 0.3 m, or greater than 0.4 m, or greater than 0.5 m, or greater than 0.6 m, or greater than 0.7 m, or greater than 0.8 m, or greater than 0.9 m, or greater than 1 m, or greater than 1.2 m.

17. The conveyor belt system according to claim 1, wherein the material of the plastic sheet is selected from the group of thermoplastic polymers, or food approved thermoplastic polymers, or polyurethane.

18. The conveyor belt system according to claim 1, wherein the conveyor belt withstands kinking.

19. The conveyor belt system according to claim 3, wherein:
    the other of the edge guiding elements turn the conveyor belt in the closed pouch configuration about a turning radius selected from the group consisting of: less than 0.6 m, or less than 0.5 m, or less than 0.4 m, or less than 0.3 m, or less than 0.2 m.

20. The conveyor belt system according to claim 1, wherein:
    the some of the edge guiding elements turn the conveyor belt in the unfolded configuration about a turning radius selected from the group consisting of: less than 0.08 m, or less than 0.07 m, or less than 0.06 m, or less than 0.05 m, or less than 0.04 m.

21. The conveyor belt system according to claim 1, further comprising a tension balancing device having rotation point and two tension guiding elements, the device supported for rotation about an axis of rotation transverse to the endless element in the pouch configuration with one of the tension guiding elements engaging one of the edge bands and the other of the guiding elements engaging the other of the edge bands such that they edge bands are separated by a distance.

22. The conveyor belt according to claim 21, wherein the material of the plastic sheet is selected from the group of thermoplastic polymers, or food approved thermoplastic polymers, or polyurethane.

* * * * *